US012398446B2

(12) United States Patent
Schrier

(10) Patent No.: US 12,398,446 B2
(45) Date of Patent: Aug. 26, 2025

(54) RHENIUM REMEDIATION IN THE PREPARATION OF MOLYBDENUM-99

(71) Applicant: Output Enablers LLC, El Granada, CA (US)

(72) Inventor: Marc Schrier, South San Francisco, CA (US)

(73) Assignee: Output Enablers LLC, El Granada, CA (US)

( * ) Notice: Subject to any disclaimer, the term of this patent is extended or adjusted under 35 U.S.C. 154(b) by 848 days.

(21) Appl. No.: 17/572,087

(22) Filed: Jan. 10, 2022

(65) Prior Publication Data

US 2022/0220579 A1 Jul. 14, 2022

Related U.S. Application Data

(60) Provisional application No. 63/135,900, filed on Jan. 11, 2021.

(51) Int. Cl.
| | | |
|---|---|---|
| *C22B 34/34* | (2006.01) | |
| *C01G 39/02* | (2006.01) | |
| *C22B 5/12* | (2006.01) | |
| *C22B 61/00* | (2006.01) | |

(52) U.S. Cl.
CPC .............. *C22B 61/00* (2013.01); *C01G 39/02* (2013.01); *C22B 5/12* (2013.01)

(58) Field of Classification Search
None
See application file for complete search history.

(56) References Cited

U.S. PATENT DOCUMENTS

| | | | |
|---|---|---|---|
| 2,579,107 | A | 12/1951 | Bertolus |
| 2,965,447 | A | 12/1960 | Zimmerley et al. |
| 2,967,757 | A | 1/1961 | Zimmerley et al. |
| 4,604,265 | A | 8/1986 | Douglas et al. |
| 5,223,234 | A * | 6/1993 | Melcher ................. C01G 39/02 423/59 |
| 5,784,423 | A | 7/1998 | Lidsky et al. |
| 6,208,704 | B1 | 3/2001 | Lidsky et al. |

FOREIGN PATENT DOCUMENTS

| | | | |
|---|---|---|---|
| CN | 108193060 | * | 6/2018 |
| CN | 108193060 | B | 8/2019 |
| KR | 10-1222588 | B1 | 1/2013 |

OTHER PUBLICATIONS

Sun et al. "Co-Volatilizing water leaching process . . . ". Hydrometallurgy. 192. ScienceDirect. 2020 (Year: 2020).*
Breillat et al. "A new Global database . . . ". Journal of Geochemical Exploration. 161. 1-15 (2016). (Year: 2016).*
Hetherington, E.L.R., "Evaluation of Neutron Activation Analysis for the Measurement of Isotopic Abundances in Molybdenum-98 Enriched Molybdenum," Australian Atomic Energy Commission, abstract p. 1, 3rd paragraph, Mar. 1987, ISBN: 0642598479; http://apo.ansto.gov.au/dspace/handle/10238/854.
International Search Report re application No. PCT/US2022/011822, dated Jun. 3, 2022.
Written Opinion re application No. PCT/US2022/011822, dated Jun. 3, 2022.
De Laeter, J.R. et al, "Atomic Weights of the Element: Review 2000 (IUPAC Technical Report)," International Union of Pure and Applied Chemistry—Inorganic Chemistry Division Commission on Atomic Weights and Isotopic Abundances, Pure Appl. Chem., vol. 75, No. 6, pp. 683-800, 2003.
Press Release: NorthStar Medical Radioisotopes Announces FDA Approval for Enhanced U.S. Mo-99 Radioisotope Production Capacity, Jan. 6, 2021 (businesswire.com/news/home/20210106005101/en).
Li, G. et al, "Separation of Rhenium from Lead-Rich Molybdenite Concentrate via Hydrochloric Acid Leaching Followed by Oxidative Roasting," Metals 2016, 6, 282; doi:10.3390/met6110282.
Sun, H. et al, "Co-Volatilizing-Water Leaching Process for Efficient Utilization of Rhenium-Bearing Molybdenite Concentrate," Hydrometallurgy, Mar. 2020, 192: 105284; https://doi.org/10.1016/j.hydromet.2020.105284.
Handbook of Chemistry and Physics, 54th edition, 1973, R.C. Weast, editor, CRC Press, Cleveland, OH, p. B-128.
Invitation to Pay Additional Fees (PCT/ISA/206), re application No. PCT/US22/11822, dated Mar. 15, 2022.
"Molybdenum Isotopes," Encyclopedia of Geochemistry, 2018 edition, William M. White, editors. (https://doi.org/10.1007/978-3-319-39312-4_219).
International Preliminary Report on Patentability/Written Opinion re application No. PCT/US2022/011822, dated Jul. 4, 2023.

* cited by examiner

*Primary Examiner* — Sheng H Davis
(74) *Attorney, Agent, or Firm* — Husch Blackwell LLP

(57) ABSTRACT

A method of preparing remediated $MoO_3$ from naturally-occurring molybdenum, or molybdenum that is enriched in one, the other or both of Mo-98 and Mo-100 isotopes from a particulate rhenium-containing $MoO_3$ matrix that contains one, the other or both of those isotopes is disclosed as is the product remediated $MoO_3$ that contains less than about 1000 ppt rhenium. In accordance with the invention, particulate rhenium-containing $MoO_3$ matrix is heated in the presence of an oxygen-containing gaseous stream to a temperature of greater than about 300° C. and less than about 800° C. The temperature and oxidative sparging are maintained for a time sufficient to assure that rhenium has been oxidized to rhenium(VII), diffuses to form the dimer ($Re_2O_7$), and is then vaporizingly removed as $Re_2O_7$, while retaining the remediated $MoO_3$.

11 Claims, 3 Drawing Sheets

RHENIUM REMEDIATION IN THE PREPARATION OF MOLYBDENUM-99

CROSS-REFERENCE TO RELATED APPLICATION

This application claims priority to U.S. application Ser. No. 63/135,900, filed on Jan. 11, 2021, whose disclosures are incorporated herein by reference.

BACKGROUND ART

Thirty-five isotopes of molybdenum (Mo) are known that range in atomic mass from 83 to 117. Seven of those isotopes occur naturally, with atomic masses of 92, 94, 95, 96, 97, 98, and 100. The natural abundance mole percentages of those isotopes are as follows: Mo-92 14.6; Mo-94 9.2; Mo-95 15.9; Mo-96 16.7; Mo-97 9.6; Mo-98 24.3; and Mo-100 9.7. [de Laeter et al., *Pure Appl Chem* 75:683-800 (2003).]

The most common isotopic molybdenum application involves molybdenum-99 (Mo-99), which is normally obtained as a fission product of bombardment of uranium-235 (U-235) with thermal neutrons in a nuclear reactor. The fission of the U-235 nucleus produces two and sometimes three lower-mass nuclei referred to as fission fragments. Approximately 6 percent of these fission fragments are Mo-99 atoms that require several steps to isolate and purify from the other U-235 fission products. The utilization of highly enriched U-235 presents a nuclear proliferation concern.

Lidsky et al., U.S. Pat. Nos. 5,784,423 and 6,208,704 teach that Mo-100 can be converted to Mo-99 by irradiation of a Mo-100-containing target with a photon beam having an intensity of at least 50 microamps/cm$^2$ and photons of energy of at least 8 MeV, with the latter patent irradiating a converter with an electron beam having an intensity of at least 50 microamps/cm$^2$ to generate a photon beam of at least 50 microamps/cm$^2$ on to the target. Mo-100 can be isolated from the mixture present in natural ores and from nuclear reactor fission products.

Mo-99, with a half-life of about 66 hours is a parent radioisotope to the short-lived gamma-emitting daughter radioisotope technetium-99m (Tc-99m), which has a half-life of about 6 hours. Tc-99m is an isotope used in various imaging applications in medicine, and is the workhorse isotope in nuclear medicine for diagnostic imaging. More specifically, Tc-99m is used for the detection of disease and for the study of organ structure and function. Tc-99m is especially useful for nuclear medicine procedures because it can be chemically incorporated into small molecule ligands and proteins that concentrate in specific organs or tissues when injected into the body.

The Mo-99 is typically either produced in a nuclear reactor as above, or a linear accelerator and is used to produce Tc-99m for medical assays and treatments. A third route is the neutron activation of Mo-98. Neutron capture by Mo-98 can either utilize isotopically enriched Mo-98 (24.3+ %), or natural abundance molybdenum with a Mo-98 content of 24.3%. Electron beam irradiation of Mo-100 yields Mo-99 from the induced Bremsstrahlung radiation as shown in Lidsky et al., above.

No matter the target or method, certain elemental impurities in the molybdenum recovered from natural ores can lead to formation of extraneous radiation that is problematic for the patient. Rhenium is a common elemental impurity in naturally occurring molybdenum ores, and can be problematic even at sub-parts per million (ppm) levels. Rhenium is not obtained along with the otherwise difficultly purifiable molybdenum from fission of uranium-235 in a reactor.

The National Institute of Standards and Technology (NIST), Gaithersburg, MD, is part of the U.S. Department of Commerce. NIST develops and disseminates standards used in businesses.

One of the NIST duties is supplying standard reference materials (SRMs). NIST supports accurate and compatible measurements by certifying and providing over 1300 Standard Reference Materials® with well-characterized composition or properties, or both. Each NIST Standard Reference Material® is supplied with a Certificate of Analysis and a Materials Safety Data Sheet, when applicable.

The NIST Standard Reference Material® 423 is molybdenum oxide ($MoO_3$) concentrate from a commercial mining and refining process in powder form. The Table below lists the constituents and their mass fractions (percent) for the constituents of Standard Reference Material® 423 from the certificate issued on 12 Feb. 2019.

| Constituent | Mass Fraction (%) |
| --- | --- |
| Copper | 0.0640 ± 0.0028 |
| Molybdenum | 58.61 ± 0.13 |
| Iron | 1.708 ± 0.055 |
| Lead | 0.0433 ± 0.0030 |
| Silver | 0.0029 |
| Bismuth | 0.006 |
| Carbon | 0.025 |
| Calcium | 0.10 |
| Chromium | 0.0034 |
| Magnesium | 0.10 |
| Manganese | 0.009 |
| Sodium | 0.2 |
| Rhenium | 0.004 |
| Sulfur | 0.063 |
| Antimony | 0.0024 |
| Vanadium | 0.0023 |
| Zinc | 0.017 |
| Acid-Insoluble Residue | 7.69 ± 0.33 |

It is thus seen that rhenium is present in about 40 parts per million (ppm) or 40,000 parts per billion (ppb) in the above, purified standard sample on a mass basis. Much of this work is with metal, so on a metal-to-metal basis, the rhenium content of the NIST Standard Reference Material® 423 is 0.006%, so 60 ppm, or 60,000 ppb.

Rhenium (Re) is positioned immediately below technetium (Tc) in the Periodic Table of Elements. The chemical properties of Re and Tc are expected to be similar and are found to be so in the chromatographic separation of $TcO_4^{-1}$ from $MoO_4^{-2}$, where $TcO_4^{-1}$ and $ReO_4^{-1}$ co-elute away from $MoO_4^{-2}$.

Rhenium has two naturally-occurring (recoverable) isotopes, Re-185 that is stable and Re-187, whose half-life is $41.3 \times 10^9$ years. There are also more than thirty unstable isotopes. Some unstable rhenium isotopes have half-lives of 70 days (Re-183), 38 days (Re-184), 3.7 days (Re-186), 64 hours (Re-182), 24 hours (Re-189) and 17 hours (Re-188). Re-186 and Re-188 are both beta-particle emitters that are used in medicinal treatments such as for pain palliation in bone cancer patients.

Rhenium-186 (Re-186) is a particularly problematic impurity when contaminating a technetium-99m-containing eluate to be used for medical purposes because the Re-186 produces high energy beta and gamma emissions that contribute adversely to a patient's overall cumulative radiation dose. Re-186 is not a naturally occurring isotope. The neutron activation of Mo isotopes, their transformation, and decay do not yield Re-186. But if Re-185 is present in the Mo sample during neutron activation, it can be activated to Re-186. As such the Re levels should be low before the Mo-98 is activated.

The mitigation results obtained by a contemplated method described herein below provide molybdenum from naturally occurring ores whose rhenium content after neutron activation measured as Re-186 is less than each of the three standards of the U. S. Food and Drug Administration (FDA) for medicinal Tc-99m. The FDA approval for enhanced medical radioisotope production of Mo-99 from enriched Mo-98 (eMo-98) was announced in a press release dated Jan. 6, 2021 [businesswire.com/news/home/20210106005101/en].

BRIEF SUMMARY OF THE INVENTION

The present invention contemplates a method for removing rhenium from a particulate rhenium-containing molybdenum matrix. The rhenium-containing molybdenum matrix can be metallic molybdenum particles and/or particles of molybdenum trioxide ($MoO_3$).

The molybdenum of the particulate matrix can be naturally-occurring that contains the naturally-occurring distribution of isotopes. Preferably, the molybdenum is enriched as to one or the other of Mo-98 or Mo-100. An isotopic mixture enriched in both Mo-98 and Mo-100 can also be used, but is less preferred. Preferably, enriched molybdenum contains about 50 to about 99 mole % of one or the other of Mo-98 or Mo-100.

A preferred particulate rhenium-containing molybdenum matrix from which rhenium is to be removed is molybdenum trioxide and the rhenium removed (remediated) from that ($MoO_3$) matrix is a rhenium(VII) oxide. Rhenium remediation from a rhenium-containing naturally-occurring molybdenum, a molybdenum matrix enriched as to one, the other or both of Mo-98 or Mo-100 that is metal, $MoO_3$ or a mixture of both the metal and oxide also thereby remediates rhenium from any ultimately-obtained Mo-99 and/or Tc-99m.

A contemplated remediated $MoO_3$ contains less than about 1000 parts per trillion (ppt) of rhenium by using neutron activation analysis. Preferably, that amount of rhenium is less than (<) about 500 ppt. One contemplated method contemplates removing rhenium from a particulate rhenium (Re) oxide-containing $MoO_3$ matrix that contains one, the other or both of Mo-98 and Mo-100 isotopes. That method comprises the steps of heating the particulate rhenium oxide-containing $MoO_3$ matrix in the presence of an oxygen-rich gaseous stream (oxidative rich sparging) to a temperature of greater than about 300° C. and less than about 800° C. The temperature and oxidative rich sparging are maintained for a time sufficient to form rhenium(VII) [Re(VII)]oxide and to vaporizingly remove (defined hereinafter) the Re(VII) oxide to form a remediated $MoO_3$ matrix. That remediated $MoO_3$ matrix contains an amount of less than about 1000 parts per trillion (ppt), preferably less than about 750 (ppt) and more preferably less than about 500 (ppt), of rhenium, while losing to vaporization less than about 0.2 percent of the molybdenum present in the $MoO_3$ matrix. The Re oxide-containing $MoO_3$ matrix is typically heated in an alumina or silica sample combustion boat.

In another aspect of this embodiment, a particulate rhenium-containing metallic molybdenum matrix containing one, the other or both of Mo-98 and Mo-100 isotopes. Here, the method comprises the steps of heating that particulate rhenium-containing metallic molybdenum matrix in the presence of an oxygen-poor gaseous stream (low oxidative sparging) to a temperature of greater than about 300 (>300)° C. and less than about 800 (<800)° C., and preferably at a temperature of about 300° C. to about 550° C. That temperature and low oxidative sparging are maintained for a time period sufficient to oxidatively convert the rhenium to a Re(VII) oxide and molybdenum of the metallic molybdenum matrix to oxidized molybdenum and form a Re(VII) oxide-containing oxidized molybdenum matrix. The heated Re(VII) oxide-containing oxidized molybdenum matrix is permitted to cool to a temperature at which it can be manipulated (handled, as for weighing, or comminuting). The cooled Re(VII) oxide-containing oxidized molybdenum matrix is preferably comminuted and the resulting particles are mixed. The mixed, comminuted matrix is returned to heating at a temperature of greater than about 300 (>300)° C. and less than about 800 (<800)° C., preferably about 600 to about 655° C., and sparged in an oxygen-rich gaseous stream (rich oxygen sparging) while maintaining the temperature and rich oxidative sparging for a time period sufficient to vaporizingly remove the Re(VII) oxide to form a remediated $MoO_3$ matrix that contains an amount of less than about 1000 parts per trillion (ppt), preferably less than about 750 (ppt) and more preferably less than about 500 (ppt), of rhenium as discussed above, while losing to vaporization less than about 0.2 percent of the molybdenum present in the matrix.

Illustratively, a powdered molybdenum oxide matrix prepared from naturally-occurring molybdenum (nMo) that contained about 5 parts per billion (ppb) rhenium metal on a metal to metal basis using neutron activation analysis prior to rhenium remediation as described above resulted in providing remediated $MoO_3$ that contained less than about 500 parts per trillion (ppt) of rhenium calculated as metallic rhenium in metallic molybdenum.

Once the desired amount of Re(VII) oxide has been vaporized out of the matrix to form the remediated $MoO_3$, the remediated $MoO_3$ can be used as such, or can be reduced to form remediated metallic molybdenum that itself can be used as a target for activation to form Mo-99 and then forms Tc-99m by radioactive decay.

Another aspect of the present invention is a remediated $MoO_3$ product prepared from rhenium-containing molybdenum, such as naturally-occurring molybdenum, or molybdenum that is enriched in one, the other or both of Mo-98 and Mo-100 isotopes. The remediated $MoO_3$ product contains less than about 1000, preferably less than about 750, and more preferably less than about 500, parts per trillion (ppt) of rhenium calculated as metallic rhenium in metallic molybdenum.

BRIEF DESCRIPTION OF THE DRAWINGS

In the figures forming a portion of this disclosure.

DEFINITIONS

Figure 1:
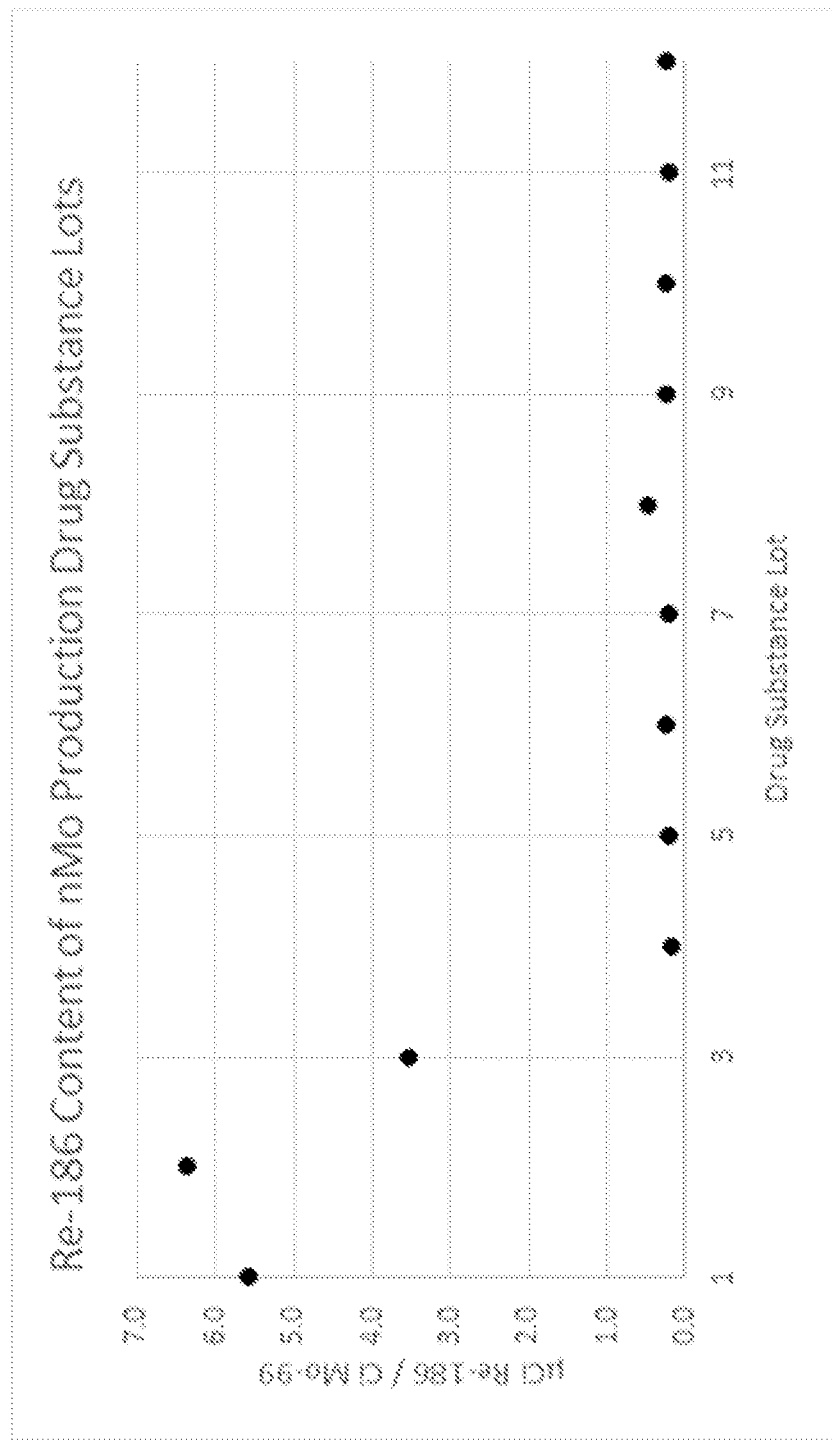
FIG. 1 is a graph that plots the ratio of µCi Re-186/Ci Mo-99 for lots of Mo that were prepared without oxidative sparging as discussed herein (Lots 1-3) and with oxidative sparging (remaining Lots), wherein the ratio is calculated as described in the Experimental Section using neutron activation analysis. The molybdenum processed was from naturally-occurring material.

As used herein, the words "vaporize", "vaporizing", "vaporizingly" and every other grammatical use of the base word "vapor" is intended to encompass the gas form of a Re(VII) oxide such as $Re_2O_7$ or $HReO_4$ as may be present as a gas. Thus, sublimation is a process of a solid changing to a gas without first converting to a liquid. Evaporation is process of a liquid turning to a gas as is boiling. Because it is not presently known whether one, or both of sublimation or evaporation are occurring here, and because both processes form a vapor phase, the Re(VII) oxide removal process is referred to herein as a vaporizing process such that the Re(VII) oxide is "vaporizingly" removed.

The word "enrich" in its various grammatical forms is used in relation to the naturally-occurring mole percentage of one isotope or another in a molybdenum matrix. As was noted previously, the natural abundance of the two molybdenum isotopes of interest here are Mo-98 24.3% and Mo-100 9.7%. Thus, any amount greater than 24.3 mole percent Mo-98 or 9.7 mole percent Mo-100 would be an enriched amount. However, it is preferred to use enrichments in which one or the other of those isotopes is present at 50 mole percent of the molybdenum up through 99 mole percent.

The present invention has several benefits and advantages.

One benefit is that its use enables production of Mo-99 and resulting Tc-99m whose concentration of radioactive rhenium such as Re-186 is less than each of the three different FDA-approved concentrations of Re-186 in injectable Tc-99m compositions.

An advantage of the invention is that its use to provide Mo-98- and Mo-100-containing irradiation targets prepared from stable molybdenum isotopes is relatively easy and inexpensive to carry out as compared to having to prepare irradiation targets from U-235 fission products obtained from a nuclear reactor.

Still further benefits and advantages will be apparent to the skilled worker from the disclosures that follow.

Detailed Description of Preferred Embodiments

The present invention contemplates preparation of remediated molybdenum that contains less than about 1000 parts per trillion (ppt), preferably less than about 750 (ppt) and more preferably less than about 500 (ppt), rhenium as measured using neutron activation analysis. The remediated molybdenum so prepared is typically used as target material for electron beam or thermal neutron irradiation to form Mo-99 and then Tc-99m. In addition, the loss of molybdenum due to vaporization is less than about 0.2 percent of the molybdenum present in the $MoO_3$ matrix.

Somewhat similar processes have been used to recover the then more precious rhenium from various molybdenum-containing ores via the metal oxides or metal sulfides. See, for example Li et al., *Metals*, 6:282 (2016); Sun et al., *Hydrometallurgy* 192:105284 (2020); U.S. Pat. Nos. 2,579,107, 2,965,447 and 2,967,757.

Those separations have been generally directed to industrial scale processes. Because previous processes have sought to recover rhenium and not molybdenum, it is believed that none has been carried out with the minimal molybdenum loss observed using a contemplated process. It also is not believed that the amount of rhenium reduction needed and achieved here has been previously contemplated, achieved nor found desirable to obtain at least in part because the small extra amount of rhenium to be obtained was not worth the cost of obtaining it to be sold as rhenium. In addition, such industrial scale production methods are not usually as precisely controllable as is a process contemplated herein.

The desired remediated molybdenum is made from a matrix that is particulate. That matrix is a rhenium-containing molybdenum particulate matrix. The molybdenum of the particulate rhenium-containing matrix can be particles of molybdenum metal or particles of a molybdenum oxide such as $MoO_2$ or $MoO_3$, or all three can be present. The preferred molybdenum particles are molybdenum oxide particles, and are most preferably particles of molybdenum trioxide, $MoO_3$. The rhenium in those $MoO_3$ matrix particles is present as $Re_2O_7$, $ReO_3$, $Re_2O_5$, $ReO_2$, $Re_2O_3$, $HReO_4$ their hydrates like $HReO_4 \cdot H_2O$ and incomplete ore decomposition products such as $ReS_2$, $ReS_3$, and $Re_2S_7$. These and related compounds present as rhenium impurities are believed to decompose and become fully oxidized to a Re(VII) oxide such as $Re_2O_7$ or $HReO_4$.

It is merely a simplification to think of the rhenium-containing molybdenum matrix as a mixture of two or more compounds, namely a rhenium-rich compound like $Re_2O_7$ and a molybdenum-rich compound like $MoO_3$. The pre-processing and such to get the material to this point are such that the rhenium is a low level dopant. The rhenium atoms are substitutional dopants that reside on individual molybdenum sites. The rhenium dopants can be expected to be homogenously distributed throughout the matrix. As such, when starting with rhenium doping levels in the parts per million range, an individual rhenium atom will very rarely have another rhenium atom as a neighbor sharing an oxygen atom. For the $Re_2O_7$ compound to form, rhenium atoms need to migrate, find one another, and form the volatile rhenium(VII) oxide dimer, $Re_2O_7$. It is for this reason that the temperatures utilized are substantially above the temperature where pure $Re_2O_7$ alone becomes volatile (about 200° C.). At the preferred temperatures, solid state diffusion enables the facile diffusion of rhenium through the molybdenum oxide matrix until they find one another. The $O_3Re$—O—$ReO_3$ dimer is then swept away from the bulk leaving the remediated $MoO_3$ substantially reduced of rhenium atoms.

In one contemplated embodiment, a particulate Re-containing $MoO_3$ matrix that contains one, the other or both of Mo-98 and Mo-100 isotopes is heated in the presence of an oxygen-containing gaseous stream (oxidative sparging) to a temperature of greater than about 300 (>300) ° C. and less than about 800 (<800) ° C. The temperature and oxidative sparging are maintained for a time sufficient to vaporizingly remove the $Re_2O_7$ while retaining the remediated $MoO_3$.

$Re_2O_7$ melts at 220° C. and boils at about 360° C., but exerts positive vapor pressure below the latter temperature. $HReO_4$ is reported to sublime rather than boil.

The particulate Re-containing $MoO_3$ matrix is heated in a furnace. The furnace used illustratively here was a resistively heated Lindberg 55647 tube furnace containing a quartz liner that extended outside of the furnace (Lindberg/MPH, Riverside, MI). Similar furnaces are available from ThermCraft, Inc., Winston Salem, NC, and Thermo Fisher Scientific, Waltham, MA.

The particulate matrix can simply be spread on the bottom of the furnace, but is more preferably contained in one or more vessels within the furnace. A vessel used for such heating should be stable from ignition or decomposition at the temperatures used and also be non-reactive with the particulate matrix or the vaporized Re(VII) oxide such as $Re_2O_7$. Many such vessels are commercially available and can be made from alumina, silica, zirconia, gold, platinum or any other well known, suitable material.

Vessels made from alumina are readily available, durable, relatively inexpensive and are useful in a contemplated process. These vessels are often referred to as "combustion boats" or "sample combustion boats" in the art and can be purchased from Heating Driver of Henan, China; Col-Int Tech of Irmo, SC; AdValue Technology of Tucson, AZ; MTI Corporation of Richmond, CA; CoorsTek® alumina combustion boats are available from Thomas Scientific of Swedesboro, NJ, and Capitol Scientific of Austin, TX.

Although the molybdenum of the particulate rhenium-containing $MoO_3$ matrix can be comprised of the naturally-occurring molybdenum that contains several molybdenum isotopes in their native percentages as set out previously, it is preferred to use molybdenum that is enriched with one, the other or both of the Mo-98 and Mo-100 isotopes. Preferably, only one or the other of Mo-98 and Mo-100 isotopes is enriched. One or the other enriched molybdenum isotope, Mo-98 or Mo-100, is present at about 50 to about 99 mole percent, more preferably at about 70 to about 99 mole percent, and most preferably at about 90 to about 99 mole percent of the molybdenum present.

Molybdenum enriched with Mo-98 is used illustratively herein. The more of the selected isotope present the better because more of the ultimately desired Mo-99 can be produced. Thus, two illustrative lots of enriched molybdenum containing 98.74% Mo-98 and one lot containing 98.65% Mo-98 were used in the studies discussed herein.

The enriched molybdenum is often referred to herein as enriched molybdenum (eMo) as compared to native or naturally-occurring molybdenum (nMo). Enriched Mo-98 and Mo-100 can be obtained from Isoflex USA (San Francisco, CA) as the oxide and also as the metal with stated isotopic purities of about 90 to about 99 percent. The actual atomic weights of those molybdenum isotopes are 97.9 and 99.9 grams per mole (g/mole), respectively. The whole number molecular weights (98 and 100) are herein for convenience.

Rhenium(VII) oxide (e.g., rhenium heptoxide; $Re_2O_7$) boils at a temperature of about 360° C. at one atmosphere, whereas molybdenum(VI) oxide (molybdenum trioxide; $MoO_3$) boils at a temperature of 1155° C. at one atmosphere. $Re_2O_7$ is reported to sublime at a temperature of about 250° C. [*Handbook of Chemistry and Physics*, 54$^{th}$ ed., W. C. Weast ed., CRC Press, Cleveland, OH, page B-128 (1973)]. $Re_2O_7$ is thus volatile at temperatures where $MoO_3$ is not particularly volatile. Utilizing this volatility difference, rhenium, in the form of rhenium(VII) oxide can be removed from molybdenum(VI) oxide by heating the sample in an oxidizing gaseous, gas-flowing environment. The volatile rhenium(VII) oxide is swept away by the gas flow while the molybdenum(VI) oxide stays in place. The vapor pressure of molybdenum(VI) oxide below 1155° C. is non-zero, so care must be taken to minimize vaporization losses.

If the particulate molybdenum matrix is metal or another compound like molybdenum(IV) oxide ($MoO_2$), then the rhenium may not be in the proper oxidation state, so the matrix must first be oxidized to molybdenum(VI) oxide. Such oxidative conditions also oxidize rhenium present in the molybdenum matrix to the requisite rhenium(VII) oxide. If the environment is not sufficiently oxidizing, insufficiently volatile lower valency rhenium oxide persists and is not removed. As a consequence, the residual amount of rhenium exceeds the desired amount.

A temperature of greater than about 300 (>300)° C. and less than about 800 (<800)° C. is used with oxygen sparging to separate the $Re_2O_7$ from the $MoO_3$ matrix. Preferably, a temperature of >550° C. and <700° C. is utilized. More preferably, that temperature is about 600° C. to about 675° C. More preferably still, a study using temperature increments of 5° C. between 610° C. and 660° C. showed molybdenum losses of less than about 0.1% up to 655° C., with an increase to 0.18% at 660° C. A temperature of about 610° C. to about 655° C. is most preferred.

In regard to the oxygen sparge, purified air can be used as can a purified air-pure oxygen mixture, pure oxygen mixed with a relatively inert gas such as nitrogen, argon, helium, neon and the like as well as pure oxygen itself. Additional gaseous oxidants can also be used such as ozone ($O_3$) and nitrous oxide ($N_2O$), and mixtures of oxygen with other gasses that do not react with a matrix under the conditions used herein to provide oxidizing mixtures can be used such as $N_2$—$O_2$, Ar—$O_2$, He—$O_2$, Ne—$O_2$, $CO_2$—$O_2$. These oxygen-containing mixtures contain about 20 to about 50 mole percent oxygen. $O_3$ and $N_2O$ can also be used and are both powerful oxidizers.

When the remediation process is carried out starting with a particulate matrix of rhenium-containing metallic molybdenum, it is preferred to use other than only pure oxygen in the sparge as molybdenum can react exothermally when heated in pure oxygen, and this can lead to uncontrolled heating. It is therefore preferred when beginning the process with a particulate matrix of rhenium-containing metallic molybdenum, that an oxygen-poor gaseous stream be used, referred to herein as "low oxygen sparging". As air contains about 20 percent oxygen by volume, an oxygen-poor gaseous stream comprising low oxygen sparging contains about 20 to about 50 volume percent oxygen. Purified air is preferred for oxidative sparging until $MoO_3$ is obtained in the heating furnace.

When starting with a rhenium-containing molybdenum matrix that is only partly oxidized to $MoO_3$, or whose molybdenum is completely oxidized to $MoO_3$, sparging is carried out using an oxygen-rich gaseous stream (rich oxygen sparging). An oxygen-rich gaseous stream comprises about 70 to about 100 volume percent oxygen. Purified oxygen is preferably used.

When being oxidized from particulate molybdenum metal to particulate $MoO_3$, the volume of the particulate matrix increases about 2- to about 4-fold with the uptake of oxygen leading to voids in the matrix, making the cooled matrix resemble the cracked and heaved appearance of a dried lake bed. The particulate matrix-containing vessel should therefore be loaded accordingly to account for the expected volume increase so as to not lose any molybdenum from the vessel.

Upon cooling to a manipulable temperature such as ambient room temperature (RT; about 20° C.) to about 40 or about 50° C., the rhenium-containing molybdenum matrix is removed from its heating vessel and comminuted, such as being ground in a mortar with a pestle or other suitable device. Where more than one vessel of rhenium-containing molybdenum matrix has been used, the contents of the processed matrices from a plurality of vessels are mixed and ground together and can thereafter be processed further in the same or different vessels.

Because the metallic molybdenum particulate matrix contains only molybdenum except for the exceedingly small amounts of rhenium and a few other metals noted previously, one can place a desired amount of the metallic molybdenum particulate matrix into a tared combustion boat (vessel) and reweigh the boat (loaded vessel) after a heating and oxidative sparging to determine the amount of starting molybdenum oxidized. The combustion boat (vessel) is permitted to cool to a manipulable temperature, preferably to ambient temperature and is then weighed again.

The heated and oxygen-sparged, newly weighed combustion boat and contents weigh more than the weight of the originally loaded vessel, with the added weight arising only from added oxygen. The number of moles of molybdenum originally present in the vessel is readily determined by division of the weight loaded by the molecular weight of the enriched molybdenum (e.g., about 97.9 to and about 99.9 g/mole for highly enriched Mo-98 and Mo-100, respectively). Dividing the weight gain in grams by the molecular weight of oxygen (15.9994 g/mole) provides the number of moles of oxygen added. Dividing the number of moles of oxygen by the number of moles of molybdenum provides the vessel average of the oxidation state of the molybdenum to provide a chemical formula of $MoO_x$, where "x" is the average stoichiometric amount of oxygen. If the molybdenum were completely oxidized, "x" would be 3.00.

In a typical preparation of $MoO_3$, a number of vessels (combustion boats) are utilized. As a result, each vessel is illustratively weighed before and after loading with particulate metallic molybdenum matrix and again after the heating and oxygen-sparging to determine the oxidation status of each vessel. The contents of all of the vessels are mixed and ground (comminuted) in a mortar with a pestle or other well-known particle size-diminishing device. The resulting comminuted materials are again loaded into separately tared vessels, weighed and sent through one or more further rounds of heating and oxygen-sparging until the above "x" value is stable about 3.00. Molybdenum metal often contains significant oxide, so if the "x" value stabilizes below 3.00, it only appears to be below 3.00 because the molybdenum started with some oxygen.

It is to be understood that the time required to achieve a desired rhenium remediation is dependent upon the rate at which the Re(VII) oxide ($Re_2O_7$) vaporizes from the $MoO_3$ matrix, and that time is dependent on the temperature, the flow rate of the oxygen-containing sparge, the depth of the charge in the boat, surface area of the charge, the rhenium solid state diffusion, and the particle size of the $MoO_3$ matrix. Heating/sparging times of a total of about 20 to about 50 hours have been found to produce excellent $Re_2O_7$ removal, particularly when starting from particulate $MoO_3$.

Individual heating/sparging times of about 8 to about 20 hours are more preferred, with times of about 10 to about 15 hours being most preferred for each heating/sparging time. Starting with a particulate metallic rhenium-containing molybdenum matrix and wherein a lower temperature and oxygen amounts are utilized, a total of about 20 to about 30 hours of heating/sparging time are typically utilized to form a Re(VII) oxide-containing oxidized molybdenum matrix. When starting with a Re(VII) oxide-containing oxidized molybdenum matrix, where higher temperatures and oxygen amounts are utilized, another total of about 20 to about 30 hours of heating/sparging time are typically utilized to form a remediated oxidized molybdenum matrix.

These "individual" heating/sparging times are preferably utilized because of the care required to avoid over-heating the particulate molybdenum metal matrix when forming the particulate Re(VII) oxide-containing oxidized molybdenum matrix, as well as during the removal of the vaporized oxidized rhenium.

Thus, when starting from a metallic molybdenum matrix, two heating/sparging times and two particle size reduction steps are typically carried out in forming the particulate Re(VII) oxide-containing oxidized molybdenum matrix. Two additional heating/sparging times and two particle size reduction steps are also typically carried out in forming the remediated particulate $MoO_3$ matrix. The first two heating/sparging times are about 8 to about 10 hours each using a temperature of about 375 to about 550° C., whereas the second two heating/sparging times are about 12 to about 15 hours each at a temperature of about 600 to about 650° C.

Use of at least two such heating/sparging time periods separated by a cooling to handling (manipulable) temperature as above, and comminution step after each is preferred. It has also been found useful to comminute the cooled matrix to reduce the particulate dimensions and mix the ground particles to help assure adequate $Re_2O_7$ escape, followed by a second heating-sparging step (double heating and sparging). Such double heating and sparging is illustrated hereinafter. The remediated $MoO_3$ so prepared is typically thereafter collected, although the purified $MoO_3$ can be reduced to molybdenum metal after preparation.

The amount of gaseous flow in the oxygen sparge is dependent upon the volume of the furnace in which the heating is carried out as well as the amount of volume taken up within the furnace by any one or more vessels containing the metallic powder or the particulate $MoO_3$ matrix to be remediated.

When starting with an oxidized molybdenum matrix, illustrative gas flows are about 80 to about 150 cubic centimeters per minute (cc/min), and typically about 100 cc/min using the furnace and quartz liner discussed in the illustrative processes hereinafter. When starting with a particulate, metallic molybdenum matrix, the sparging gas flow is about 500 to about 900 cc/min, and typically about 800 cc/min.

Thus, with the illustrative furnace/quartz tube insert utilized here, the gas sparging volume/min is about a factor of about 6- to about 8-fold higher during the metal to metal-oxide step, when used, than in the oxide to remediated oxide step. Conversely, the heating temperature of the metal to metal-oxide step, when used, is about 60 to about 80 percent of that used in the metal oxide to remediated matrix step.

The quartz liner tube used in these studies had a 126 mm ID, a wall thickness of 2.5 mm, and an outside diameter (OD) of 131 mm. The tube was 163 cm long. Such dimensions are merely illustrative as one skilled in the art would understand that quartz liner tubes of other dimensions could also be used.

When starting with $MoO_3$, the gas flow need only be sufficient to sweep the vaporized Re(VII) oxide out of the immediate region of the material being remediated so that material does not redeposit upon remediated material and the flow does not sweep out the molybdenum being remediated. When starting with Mo metal, a large volume of gas is needed, and it must contain, e.g., at least 1.5 mole equivalents of $O_2$ per mole of Mo to achieve the $MoO_3$ stoichiometry. Additionally, the heating and sparging can be carried out at less than atmospheric pressure to assist the rhenium(VII) oxide sublimation.

A skilled worker can readily adapt the heating rates, temperatures, oxygen-sparging gas compositions, time and flow rates for a differently sized furnace liners and numbers of combustion boats utilized.

The rhenium-containing molybdenum matrix is present in particulate form. The particle size can be in irregular "chunk" form due to the difficulty in grinding the metal or $MoO_3$ matrix, with largest dimensions being about 5 cm. Smaller sizes are preferred.

Once heated for a total time period of about 20 to about 50 hours and cooling to handling (mechanically or manually manipulatable) temperature, the formed large $MoO_3$ matrix pieces crumble easily (are friable). The large $MoO_3$ matrix particles are preferably ground or otherwise comminuted to pass through a USA standard Mesh No. 20 (ASTM E11) sieve (0.85 mm openings), typically in two about 10 to about 25 hour tranches. Still smaller particle sizes such as micron dimensioned particles can be used as may be desired.

In another aspect of this embodiment, powdered form of metallic molybdenum matrix that includes one, the other, or both of Mo-98 and Mo-100 isotopes as well as metallic rhenium dispersed within that matrix is heated in the presence of an oxygen sparge using an oxygen-poor gaseous stream as above to a temperature of greater than about 300 (>300) ° C. and less than about 800 (<800) ° C., preferably using the lower temperatures discussed above such as at about 375 to about 550° C. It is preferred to utilize relatively lower temperatures of about 350 to about 425° C. and oxygen-poor gaseous stream, e.g., air, for the initial heating/sparging tranche, and higher temperatures of about 365 to about 550° C. with air as the oxygen-poor gaseous stream for a second heating/sparging tranche. The previously discussed higher gas flow stream is used at this stage. The formed rhenium(VII) oxide-containing $MoO_3$ matrix is preferably comminuted and then reheated, sparged with oxygen-rich gaseous stream such as oxygen gas, using the above-discussed low gaseous flow rate, and maintained at a temperature of about 575 to about 610° C. for a time period sufficient to vaporizingly remove the $Re_2O_7$ while retaining the $MoO_3$ to form remediated $MoO_3$ containing one, the other, or both of Mo-98 and Mo-100 isotopes.

It is preferred to remove the heated boat and repeat this higher temperature lower gas flow rate step at least one more time to achieve the desired amount of remediation. It is also preferred to remove the matrix from a combustion boat, comminute the matrix and replace it in a tared combustion boat and reweigh the loaded combustion boat prior to repeating this step so that molybdenum loss can be calculated, if desired.

The particle size distribution of the powdered form of metallic molybdenum matrix thus far utilized is presently unknown. That size, is however, believed to be sufficient to collect about 90% of the particles between a USA standard Mesh No. 20 and a Mesh No. 100 (ASTM E11) sieve (about 850 μm to about 150 μm opening).

In one illustrative remediation, a powdered (particulate) molybdenum oxide matrix prepared from naturally occurring molybdenum (nMo) contained about 5 parts per billion (ppb) rhenium metal prior to undergoing rhenium remediation as described above resulted in providing remediated $MoO_3$ that contained less than 500 parts per trillion (ppt), e.g., <210 ppt and <400 ppt for two other runs, of rhenium calculated as metallic rhenium in metallic molybdenum. Using two lots of 98% enriched eMo-98 that began at 18 ppb and 11 ppb rhenium had final values of <100 ppt and <500 ppt rhenium, respectively, after remediation.

Because one basis for removing rhenium from the molybdenum relates to the chemical similarity of rhenium and technetium, and the unwanted radioactivity provided by Re-186 that can accompany recovered Tc-99m, the relative percentages of molybdenum and rhenium are usually not as important as are the relative amounts of radiation. It is to be remembered that Re-186 radioactivity decay half-life is 3.8 days (91.2 hours), whereas the half-life of Mo-99 is 2.75 days (66 hours). Because there is relatively little rhenium present in the native molybdenum or even the about 90 to about 99% enriched molybdenum and still less in the remediated molybdenum from either source, it is preferred to characterize the amount of rhenium present in a remediated Re(VII)-containing $MoO_3$ matrix as a ratio of micro-Curies (μCi) of Re-186 to the number of Curies of Mo-99 (μCi Re-186/Ci Mo-99).

That calculation and measurement is carried out using neutron activation analysis (NAA) of the remediated matrix. The value of the μCi Re-186/Ci Mo-99 ratio is about 1 to about 0.001, and preferably about 0.5 to about 0.05, and most preferably about 0.1 to 0.3.

In carrying out the assay, a remediated Re(VII)-containing $MoO_3$ matrix is irradiated with neutrons for six days. The emitted radiation is measured about 30 to about 36 hours after that irradiation stops and the ratio is calculated. Because the rhenium radioactivity lasts longer than that from molybdenum (91 vs. 66 hr. half lives), and although both the numerator and denominator decrease in size with time, the molybdenum radiation denominator gets smaller faster and therefore as time progresses, the ratio increases in value.

Illustrative Processes:

Illustrative Process 1:

A sample of naturally occurring molybdenum(VI) oxide powder that contained about 5 ppb rhenium was loaded into two large non-reactive alumina sample combustion boats with internal dimensions of 17.5 cm long×6.2 cm wide×5.5 cm deep. The boats were loaded into a quartz liner placed within a resistively heated tube furnace, and an oxygen flow of 100 cc/minute (cc/min) was initiated.

The quartz liner tube used in these studies had a 126 mm ID, a wall thickness of 2.5 mm, and an outside diameter (OD) of 131 mm. The tube was 163 cm long.

The furnace was heated at 10° C./minute to 650° C. where it was maintained for 24 hours. Upon cooling, the oxygen flow was suspended.

Once cool, the boats were removed, the molybdenum(VI) oxide was removed from the boats, ground in a mortar with a pestle, returned to the boats, and re-loaded into the furnace. Oxygen flow was reestablished at 100 cc/min, and the furnace was again heated at 10° C./min to 650° C. where it was maintained for another 24 hours. Upon cooling, the oxygen flow was terminated. Once cool, the boats were removed, the molybdenum(VI) oxide was removed from the boats, and ground in a mortar with a pestle. Neutron activation analysis put the final rhenium content at approximately <400 ppt.

Illustrative Process 2:

63.3 g Mo-98 metal powder was loaded into each of three 9 (length)×9 (width)×3 (height) cm alumina windowed boats. 70.0 g of Mo-98 metal powder was also loaded into each of another three 9 (length)×9 (width)×3 (height) cm alumina boats. The six boats were loaded into a quartz tube-lined resistively heated tube furnace three two boat piles deep, where each of the 70.0 g boats was upon a 63.3 g-containing windowed boat. The window permits gases to flow in and out of the lower boats even when covered by another boat. Each of the windowed boats was placed upon a 9 (length)×6 (width)×2 (height) cm alumina boat that was empty and used to minimize the risk of thermal expansion of the wider boats from cracking the quartz tube. These boats are from Heating Driver noted previously.

Under an air flow of 790 cc/min, the setup was heated at 10° C./min to 300° C., then 0.8° C./min 375° C. and maintained at 375° C. for 10 hours.

Once cooled to room temperature, the $MoO_x$ (x is to signify that the material is no longer Mo metal nor completely oxidized to $MoO_3$) chunks were broken up, the contents combined, mixed, and re-loaded back into the boats; 81.7 g into the lower windowed boats and 90.3 g to the upper boats.

Under an air flow of 790 cc/min, the setup was heated at 10° C./min to 365° C., then 0.8° C./min 550° C. and maintained at 550° C. for 10 hours.

Once cooled to room temperature, the $MoO_3$ chunks are broken up, the contents combined, mixed, and re-loaded back into the boats; 93.1 g into the lower windowed boats and 102.9 g to the upper boats.

Under an oxygen flow of 790 cc/min, the setup was heated at 10° C./min to 540° C., then 1° C./min 600° C. and maintained at 600° C. for 12 hours.

Once cooled to room temperature, the material was ground with a mortar and pestle, the contents combined, mixed, and re-loaded back into the boats; 93.2 g into the lower windowed boats and 103.1 g to the upper boats.

Under an oxygen flow of 100 cc/min, the setup was heated at 10° C./min to 600° C., then 1° C./min 610° C. and maintained at 610° C. for 12 hours.

Once cooled to room temperature, the material was ground with a mortar and pestle, sieved through a 20 mesh stainless steel sieve (850 μm; ASTM E11), the contents combined, and mixed.

Re-186 Post-Mitigation Results with nMo

Samples of naturally-occurring molybdenum oxide were treated as generally described in the above illustrative process using two 24-hour heating steps separated by cooling, comminuting (e.g., grinding) the $MoO_3$-containing matrix between the heating steps and including a final grinding step. The first three samples (Lots 1-3) did not include oxidative sparging, whereas the following nine samples (Lots 4-12) utilized the oxidative sparge during both heating steps. The μCi Re-186/Ci Mo-99 results are shown below and in FIG. 1.

| Lot Number | μCi Re-186/ Ci Mo-99 |
|---|---|
| 1 | 5.585 |
| 2 | 6.358 |
| 3 | 3.540 |
| 4 | 0.181 |
| 5 | 0.192 |
| 6 | 0.226 |
| 7 | 0.224 |
| 8 | 0.483 |
| 9 | 0.239 |
| 10 | 0.235 |
| 11 | 0.208 |
| 12 | 0.237 |

Figure 2:
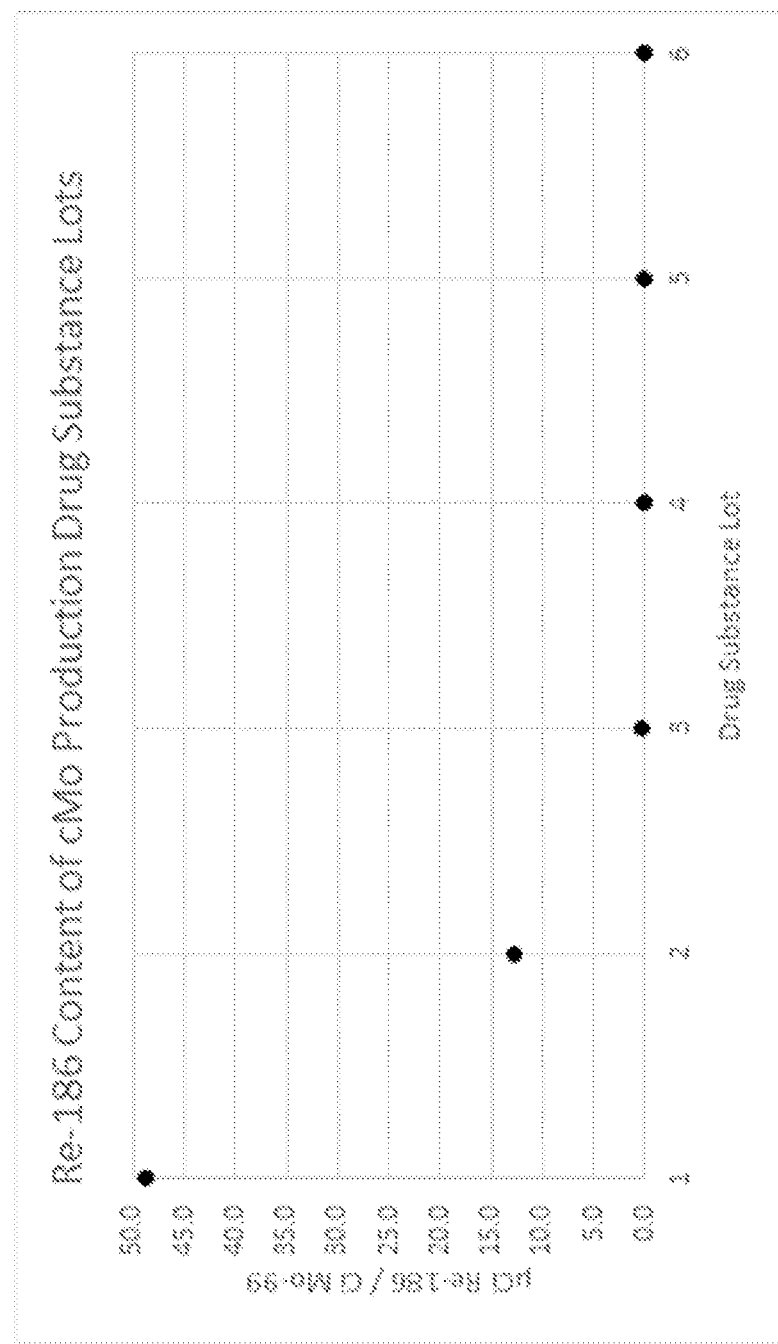
FIG. 2 is a graph that plots the ratio of µCi Re-186/Ci Mo-99 for lots of Mo-98 as described in FIG. 1, in which Lots 1 and 2 were carried out without an oxygen sparge, whereas the remaining Drug Substance Lots were created using the oxidative sparging. The molybdenum processed was from enriched material, eMo, that contained >98% Mo-98. The molybdenum for the four oxygen sparged Lots 3-6 started with 32 ppb rhenium and ended with less than 0.5 ppb.

A similar study was carried out with enriched molybdenum at >98% Mo-98 (eMo). Here, the first two samples (Lots 1 and 2) were prepared without an oxidative sparge, whereas the next four samples (Lots 3-6) were prepared using two 24-hour heating/sparging steps, each followed by cooling to handling temperature and grinding the matrix. The μCi Re-186/Ci Mo-99 results of this study are shown in the table below and also in FIG. 2.

| Lot Number | μCi Re-186/ Ci Mo-99 |
|---|---|
| 1 | 48.859 |
| 2 | 12.793 |
| 3 | 0.215 |
| 4 | 0.080 |
| 5 | 0.056 |
| 6 | 0.072 |

Figure 3:
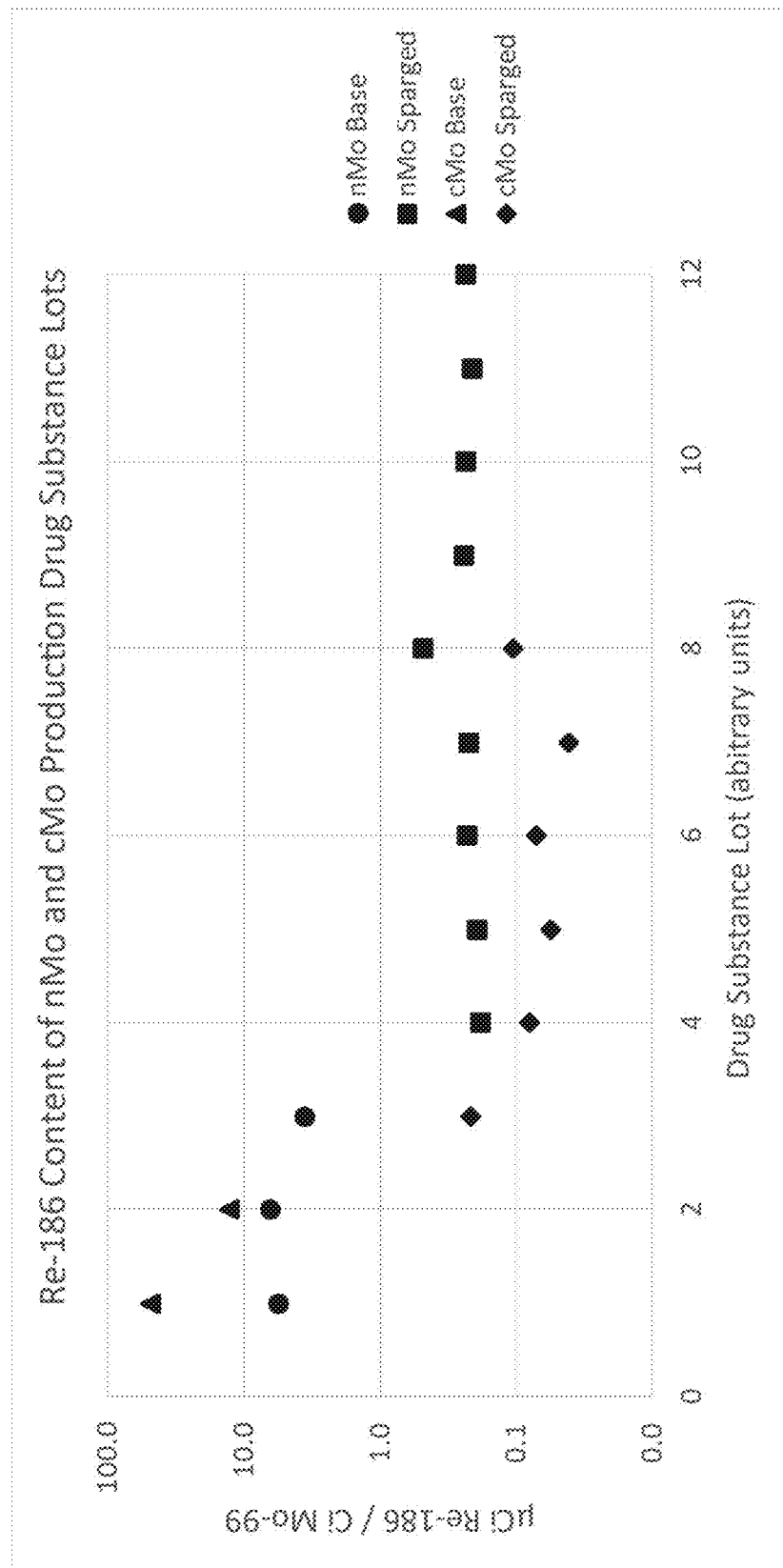
FIG. 3 is a composite graph whose y-axis in log form for the ratios µCi Re-186/Ci Mo-99 for both naturally-occurring molybdenum (nMo) and >98% enriched Mo-98 (eMo) showing pre-mitigation and post-mitigation rhenium content of both nMo and eMo. Pre-mitigation data for nMo and eMo samples are shown as black circles and black triangles, respectively, whereas post-mitigation ratios for oxygen-sparged nMo and eMo samples are shown as black squares and black diamonds, respectively.

A comparison of the pre-mitigation and post-mitigation rhenium content of both the nMo and eMo samples by was made using μCi Re-186/Ci Mo-99 data. Those results are shown in FIG. 3.

Determination of Vaporization Molybdenum Loss $MoO_3$ is volatile; it sublimes or otherwise vaporizes. The higher the heating/sparging temperature, the longer the time, the higher the flow rate, the greater the molybdenum loss. The initial steps of oxidizing the molybdenum to $MoO_3$ should provide insignificant molybdenum loss due to vaporization because of the low temperatures used.

Consequently, only the last heating/sparging step(s) are used. Those last heating/sparging steps are typically done at about 610° C. for 12 hours each. There is also usually a cooling/grinding step therebetween during which small amounts of the reaction mixture can be lost prior to the final heating/sparging step.

Thus, noting the amount of $MoO_3$ matrix present in the sample combustion boats before and after the last heating/sparging step provides a mass change due to vaporization loss of molybdenum as $MoO_3$. Where two heating/sparging steps at the elevated temperature are used, the determined mass change for the final step is multiplied by two to provide a measure of molybdenum loss that is converted to a percentage of the amount of molybdenum lost due to vaporization.

Data from a study of the vaporization molybdenum loss carried out at different temperatures with other reaction parameters held constant are shown in the Table below. Each value would be doubled in determining molybdenum loss.

| Run | Percent loss | Temperature (° C.; 24 Hours) |
|---|---|---|
| 1 | 0.09 | 660* |
| 2 | 0.05 | 655 |
| 3 | 0.08 | 650 |
| 4 | 0.06 | 645 |
| 5 | 0.05 | 640 |
| 6 | 0.04 | 635 |
| 7 | 0.05 | 630 |
| 8 | 0.06 | 625 |
| 9 | 0.02 | 620** |
| 10 | 0.04 | 615 |
| 11 | 0.04 | 610 |

*28.7 hour heat/sparge.
**12 hour heat/sparge

Each of the patents, patent applications and articles cited herein is incorporated by reference.

The foregoing description and the examples are intended as illustrative and are not to be taken as limiting. Still other variations within the spirit and scope of this invention are possible and will readily present themselves to those skilled in the art.

What is claimed:

1. A method of removing rhenium from a particulate rhenium (Re) oxide-containing $MoO_3$ matrix that contains one, the other or both of Mo-98 and Mo-100 isotopes that comprises the steps of:
   a) heating said particulate rhenium oxide-containing $MoO_3$ matrix in the presence of an oxygen-rich gaseous stream (oxidative rich sparging) to a temperature of greater than about 300° C. and less than about 800° C.;
   b) maintaining the temperature and oxidative rich sparging for a time sufficient to form rhenium (VII) [Re (VII)] oxide and to vaporizingly remove said Re (VII) oxide to form a remediated $MoO_3$ matrix that contains an amount of less than about 1000 parts per trillion of rhenium, while losing to vaporization less than about 0.2 percent of the molybdenum present in the $MoO_3$ matrix;
   c) interrupting said heating and oxidative sparging of step b) after a time period of about 8 to about 20 hours;
   d) permitting the heated matrix to cool to a temperature at which the matrix can be handled; and
   e) comminuting the matrix, mixing the resulting comminuted matrix, and returning the mixed comminuted matrix to heating and oxidative sparging for a further time period of about 8 to about 20 hours.

2. The method according to claim 1, wherein the molybdenum isotopes of said particulate rhenium oxide-containing $MoO_3$ matrix are present at the naturally-occurring isotopic ratios.

3. The method according to claim 1, wherein one or the other of Mo-98 or Mo-100 isotopes of said particulate rhenium oxide-containing $MoO_3$ matrix is present in an amount of about 50 to about 99%.

4. The method according to claim 1, wherein said particulate rhenium oxide-containing $MoO_3$ matrix is prepared by heating particulate rhenium-containing metallic molybdenum matrix in the presence of an oxidative sparge at a temperature of greater than about 300° C. and less than about 800° C. for a time period of about 20 to about 30 hours.

5. The method according to claim 1, wherein said heating temperature is greater than about 550° C. and less than about 700° C.

6. The method according to claim 1, wherein said heating temperature is about 610° C. to about 655° C.

7. The method according to claim 1 including the further step of reducing said remediated $MoO_3$ matrix to form metallic molybdenum that contains less than about 1000 parts per trillion of rhenium calculated as metallic rhenium in metallic molybdenum.

8. The remediated $MoO_3$ product prepared in accordance with the method of claim 1.

9. The remediated $MoO_3$ product according to claim 8, wherein the molybdenum is present in an amount of about 50 to about 99% of one or the other of Mo-98 or Mo-100 isotopes.

10. A remediated metallic molybdenum product prepared from the method according to claim 1, said remediated molybdenum metallic product containing less than about 1000 parts per trillion of rhenium calculated as metallic rhenium in metallic molybdenum.

11. The remediated metallic molybdenum product according to claim 10, wherein the molybdenum is present in an amount of about 50 to about 99% of one or the other of Mo-98 or Mo-100 isotopes.

* * * * *